United States Patent [19]
Zinsmeyer et al.

[11] 3,935,741
[45] Feb. 3, 1976

[54] LEVEL SENSOR

[75] Inventors: Herbert G. Zinsmeyer; Rodney L. Johnson, both of Austin; Ralph H. Genz, Leander, all of Tex.

[73] Assignee: Dresser Industries, Inc., Dallas, Tex.

[22] Filed: Mar. 7, 1974

[21] Appl. No.: 448,978

Related U.S. Application Data

[63] Continuation-in-part of Ser. No. 388,593, Aug. 15, 1973, abandoned.

[52] U.S. Cl. .................. 73/313; 33/126.6; 73/311; 73/321; 340/347 P
[51] Int. Cl.² ...................................... G01F 23/12
[58] Field of Search ............ 73/313, 311, 312, 314, 73/321; 33/126.6; 340/244 A, 244 D, 347 P

[56] References Cited
UNITED STATES PATENTS

| | | | |
|---|---|---|---|
| 1,396,155 | 11/1921 | Bartlett et al. | 73/311 |
| 2,899,751 | 8/1959 | Mayes | 33/126.6 |
| 3,078,715 | 2/1963 | Mayes | 73/313 |
| 3,090,232 | 5/1963 | Mayes | 73/321 |
| 3,140,609 | 7/1964 | Mayes | 73/311 |
| 3,283,578 | 11/1966 | Moore | 73/321 |
| 3,555,905 | 1/1971 | George | 73/321 |
| 3,558,861 | 1/1971 | Collins et al. | 340/347 P X |
| 3,633,193 | 1/1972 | Milo | 73/321 X |

FOREIGN PATENTS OR APPLICATIONS

| | | | |
|---|---|---|---|
| 214,127 | 6/1968 | U.S.S.R. | 73/311 |
| 263,921 | 6/1970 | U.S.S.R. | 73/313 |

Primary Examiner—Richard C. Queisser
Assistant Examiner—Joseph W. Roskos

[57] ABSTRACT

A storage tank liquid level sensor for indicating levels of two immiscible liquids in the tank wherein a first magnet is carried by a float on top of one liquid and a second magnet is carried by a float on top of the other liquid, the first magnet operating a switch to indicate when the one liquid reaches a predetermined level and the second magnet moving a coded tape with respect to a read head in accordance with changes in the level of the other liquid, a transmitter to transmit data from the read head, a receiver for such data, an arithmetic logic unit to convert the data to binary coded decimals, a memory unit for storage of BCD data, and a display unit for selectively addressing the computer and displaying selected data.

21 Claims, 10 Drawing Figures

LEVEL SENSOR

CROSS-REFERENCES TO RELATED APPLICATIONS

This is a continuation in part of Ser. No. 388,593 filed Aug. 15, 1973 now abandoned, and is also related to subject matter disclosed in Ser. No. 398,987 filed Sept. 20, 1973 now abandoned.

BACKGROUND OF THE INVENTION

1. Field of the Invention

This invention relates to liquid level sensors.

2. Description of the Prior Arts

Storage tank liquid level sensors of various types utilizing a float which floats on the surface of the liquid have heretofore been proposed. In U.S. Pat. No. 3,283,578 to Moore, for example, an outer magnet carried in a float surrounds a tube which contains an inner magnet mounted on a continuous tape. The tape is provided with visual markings to indicate the level of liquid in the tank.

A similar device is disclosed in U.S. Pat. No. 3,555,905 to George, however instead of visual markings on a tape George drives a potentiometer which is coupled to a meter for providing a continuous reading of the level in the tank.

U.S. Pat. No. 2,054,212 to Bacon discloses apparatus wherein a float drives a drum on which visual level markings are presented.

U.S. Pat. No. 3,162,044 describes a system in which a float hanging from a chain rotates a pulley which is connected to encoding cylinders provided with spaced magnets. The magnets are read by pickup heads and signals from these pickup heads are transmitted to recording heads which record indications of liquid level on magnetic tape.

In the patent to Mayes, U.S. Pat. No. 3,078,715, photocells are used to read a coded tape and present a coded signal indicative of tank level. However, the system disclosed by this patent is incapable of continuous monitoring of tank level, but must be actuated each time a reading is desired.

None of the foregoing patents provides continuous and accurate monitoring of liquid levels in a tank, combined with storage of the liquid level data and means for selectively presenting a visual output of liquid level data at a remote location. Nor do any of these patents disclose any means by which an indication of low level of the liquid can be provided, nor any means for indicating an excessive amount of water in a gasoline storage tank.

SUMMARY OF THE INVENTION

It is an object of this invention to provide a device which can continually monitor the stored liquid inventory in a tank of substantially any size, shape or orientation. It is another object of this invention to provide such a device which has the further capability of providing an indication of another, immiscible liquid in such a tank. Still another object of this invention is to provide such monitoring by means which produces data on liquid levels in binary form, which is then transmitted to a remote device for conversion to binary coded decimal (BCD) form for storage and selective display. It is another object of this invention to provide such a device which will continually update the memory as levels of liquid in the tank change.

According to the present invention these and other objects are accomplished by providing a binary coded tape with means to move said tape with respect to a code detector in accordance with the level of the primary liquid in the tank, whereby binary data is produced by the detector, which data is subsequently coverted to BCD form, stored and selectively displayed. In a preferred embodiment of the invention levels of a plurality of liquids are detected, as by use of a separate float for each liquid, each float having a density such that it will float on a different liquid. Preferably the floats carry magnets, the movement of one of which moves the binary coded tape and the movement of another of which causes a switch to be closed to indicate when a second liquid has reached a particular level. In a preferred form of the invention novel floats are provided.

According to a preferred embodiment of the invention, where it is used to produce data on gasoline storage tanks, the reading and transmitting functions are electrically isolated from the computing, storage and display functions in order to avoid the possibility of electrical spark in the hazardous atmosphere of the gasoline storage tank. Multiplexing is used to minimize power requirements. Where a plurality of tanks are being monitored, means are provided for selecting the tank whose data is to be displayed.

The present invention comprises means for determining the level of a liquid in one or a plurality of storage containers, such as underground storage tanks. Although the invention is described primarily in terms for measuring gasoline in an underground tank, it is apparent that it may be adapted to many other applications. In its preferred embodiments, the instrument includes means for providing an indication of low liquid level at a preselected level in the tank, and an indication that a predetermined amount of water has accumulated in a gasoline tank, for example.

The level of the primary liquid is sensed by photocouplers which read a binary coded tape driven by a float and reel mechanism. In the specific embodiment disclosed the binary code is transmitted to a special purpose computer, capable of receiving data from four tanks. The computer converts the binary data to a binary number indicative of liquid volume, and to binary coded decimal (BCD) for display. The volume of each tank is stored in a register file for display when selected. The low level indicator and the water in tank indicator are displayed automatically and continuously.

DESCRIPTION OF THE PREFERRED EMBODIMENTS

The invention will be described principally in terms of its application to underground storage tanks for gasoline, as used at retail service stations, for the continuous monitoring of the amount of gasoline in a plurality of storage tanks, for indicating a low level of gasoline in the tanks, and for determining when the amount of water condensed in any tank has reached an objectionable level. The invention is not, however, limited to such an application, but instead the apparatus of this invention is useful, as will be apparent to those skilled in the art, in monitoring the amounts of various liquids in storage tanks of any size, shape or orientation.

In Tank Equipment

Figure 1:
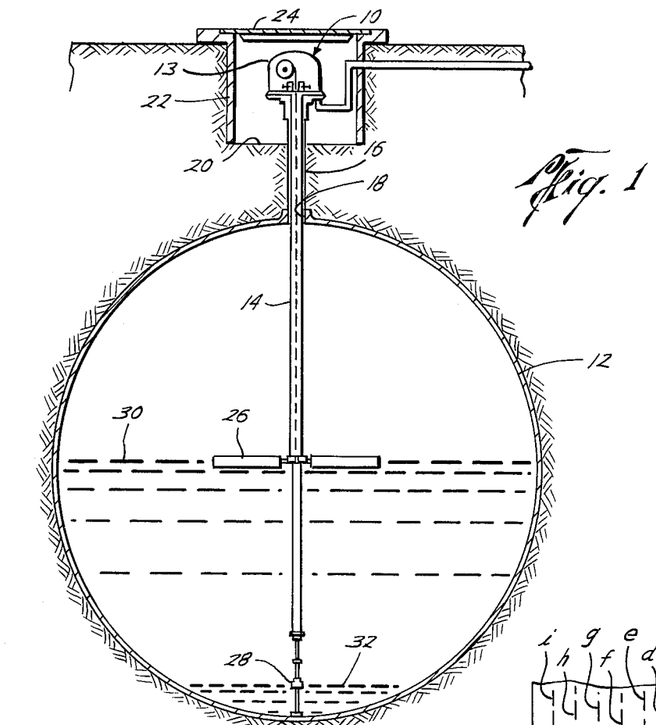
FIG. 1 is a vertical sectional view of one embodiment of the apparatus of this invention, shown installed in a tank.

In FIG. 1 a sensor 10 according to this invention is shown installed in an underground cylindrical storage tank 12 whose axis is disposed substantially horizontally. The sensor includes a housing 13 having a tubular member 14, made of non-magnetic material, extending vertically downwardly therefrom through a conduit 16 which extends from an opening 18 in the top of the tank to a pit 20 formed in the surface of the ground above the tank. The pit 20 may be suitably lined, as shown at 22, and provided with a manhole cover 24. The tubular member 14, together with its attached apparatus, extends downwardly substantially to the bottom of the tank. As shown in the drawing, such attached apparatus includes an upper float 26 and a lower float 28, the upper float having a density such that it floats on the surface 30 of the gasoline and the float 28 having a density such that it floats on the surface 32 of a layer of water below the gasoline.

Figure 2:
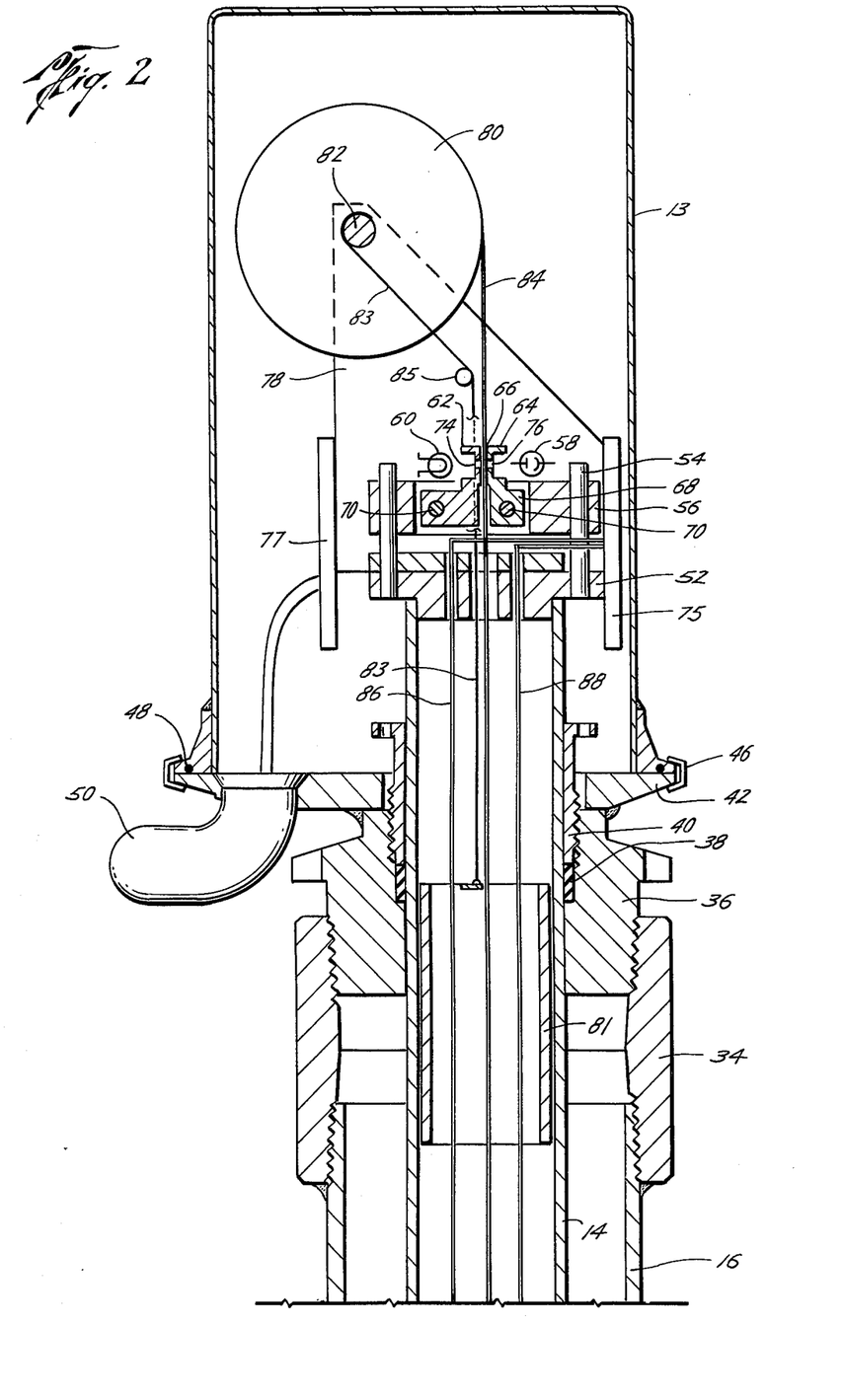
FIG. 2 is an enlarged vertical sectional view of an upper portion of the embodiment of the apparatus shown in FIG. 1.

In the embodiment shown in the drawing, as best seen in FIG. 2, the upper end of the pipe 16 is provided with a suitable coupling member 34 which has connected thereto a bushing 36 providing an internal stuffing box containing a packing 38 and gland ring 40 to provide a seal around the tubular member 14. A flange 42 connected to the bushing 36 provides means for attaching the housing 13, as by means of the clamp ring 46, a water tight connection being provided by the O-ring 48. A conduit 50 is provided in the flange 42 for conducting electrical leads away from the installation.

The upper end of the tubular member 14 is fitted with a flange 52 which has located thereon, by means of dowel pins 54, a vertically adjustable read head holder 56 which provides supports for a horizontally adjustable read head 68, by means of dowel pins 70. The read head has mounted thereon a plurality of photocouplers comprising phototransistors 58 and light emitting diodes (LED's) 60, such as, for example, Spec-Tronics, Inc. Part Nos. SD-1440-3 and SE-1450-3. The LED's 60 and phototransistors 58 are mounted in apertures 74, 76 in upwardly extending flanges 62 and 64 of the read head, on opposite sides of a slot 66.

Electrical conductors (not shown) are connected between the LED's and phototransistors and a printed circuit board 75. This board and printed circuit board 77 are provided for transmission of data, electrical connections to the remainder of the equipment being made through conduit 50.

A bracket 78 also mounted on the flange 52 extends upwardly therefrom and provides a support for a reel 80 rotatably mounted thereon by means of a shaft 82. A binary coded tape 84 feeds from the reel vertically downwardly between the upstanding flanges 62 and 64 into and axially of the tubular member 14. A pair of wires 86, 88 also extend longitudinally of and within the tubular member 14, passing upwardly through suitable openings in the flange 52 and then to printed circuit board 75.

The reel 80 is preferably one which exerts a constant tension on the film 84, as may be accomplished by means of a constant force spring of the type sold under the trademark SPIRATOR, or by a counterweight or a continous loop film.

In the embodiment shown in the drawing a counterweight 81 is shown suspended on a pair of lines 83, such as a wire or cable, which runs through holes (not shown) in read head 68, and over an idler 85 and is wound onto the shaft 82 opposite the direction of winding of the film 84.

Figure 3:
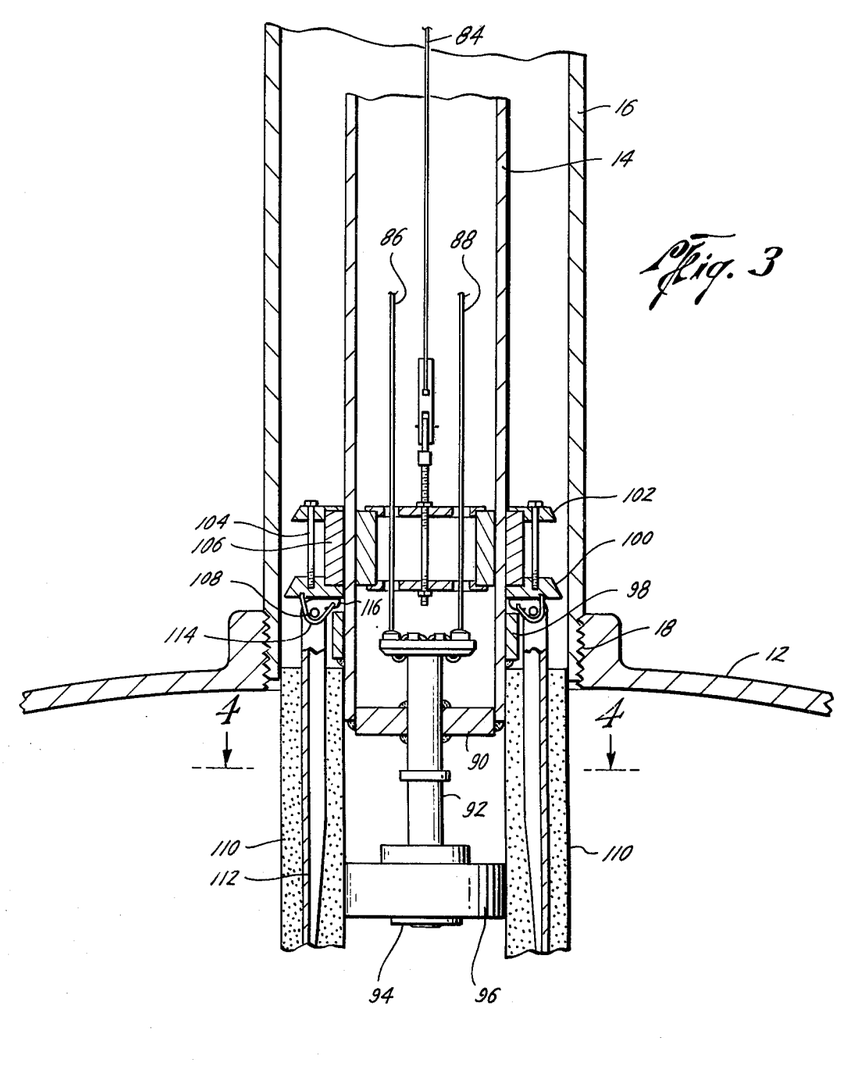
FIG. 3 is a vertical sectional view of a lower portion of the embodiment shown in FIG. 1, showing the apparatus being lowered into the tank.

The lower portion of the apparatus is shown in some detail in FIG. 3, which shows the apparatus being lowered through the pipe 16 into tank 12. As there shown, the lower end of the tubular member 14 is closed by a disc 90 in which there is rigidly received a tubular member 92, made of non-magnetic material, which extends upwardly a short distance into the tubular member 14 and extends downwardly to terminate at its lower end with a flange 94 which retains a float 96 thereon.

Figures 4, 5:
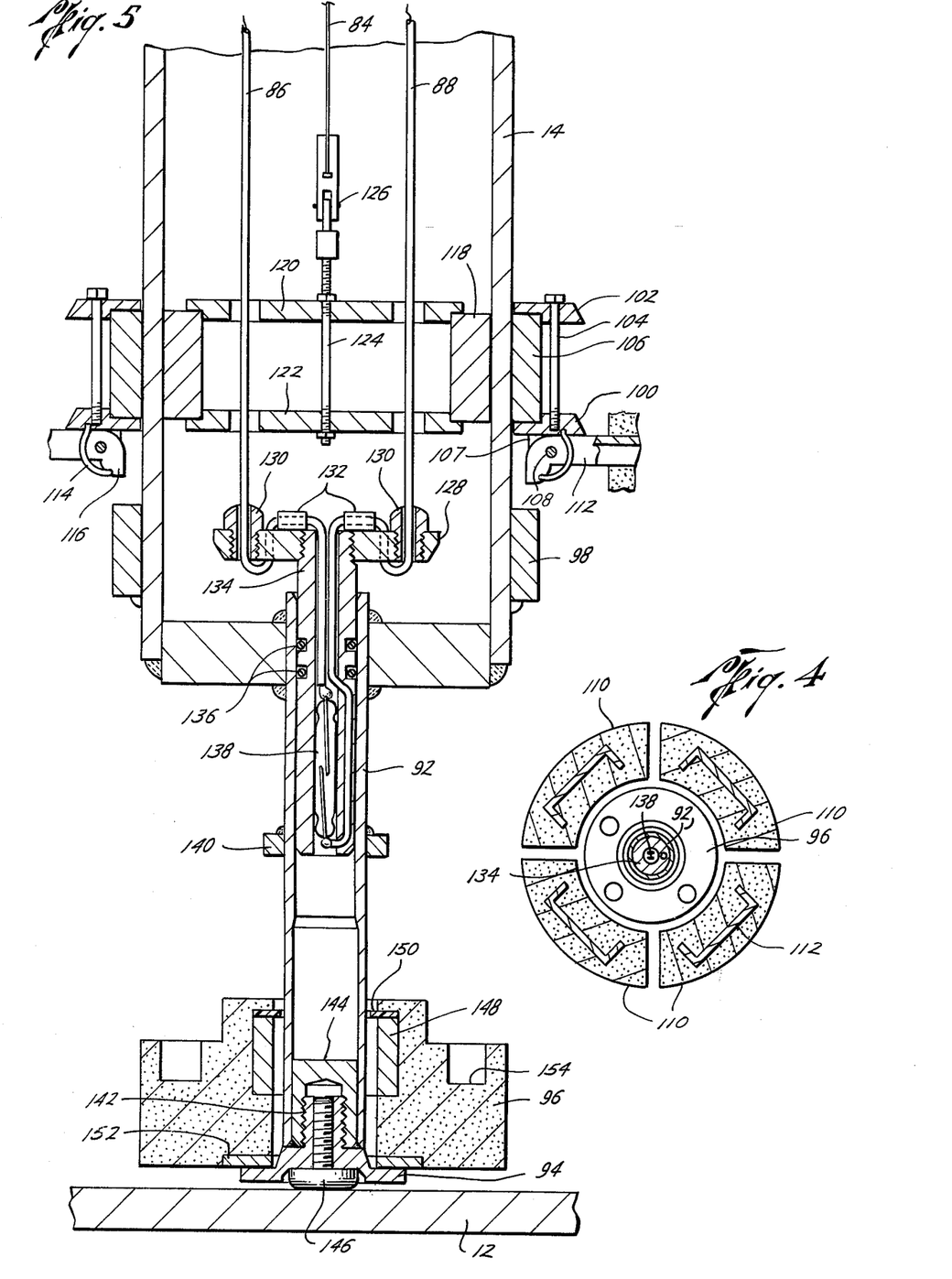
FIG. 4 is a horizontal sectional view of the embodiment of FIG. 1, taken at line 4—4 of FIG. 3.
FIG. 5 is a vertical sectional view of the lower portion of the embodiment shown in FIG. 1, shown in its installed position in the tank.

As best seen in FIG. 5, just above the bottom of the tubular member 14 an annular ring 98 is affixed thereto. Above this annular ring a pair of annular flanges 100, 102 are slidably received around the member 14, and retain between them, as by means of bolts 104, a ring magnet 106 which is slidable on the tubular member 14.

The lower flange 100 has four downwardly extending ears 107 in which are mounted four horizontally extending pins 108, each of which has pivotally mounted thereon a quarter circle float 110, the four quarter circle floats together forming float 26. The floats 110 are adapted to pull into a circular configuration, as shown in FIG. 4, having a diameter slightly less than the inside diameter of the pipe 16. As shown, the floats 110 comprise structural elements 112 having molded thereon a low density material, such as rigid urethane foam of the self-extinguishing type, coated with a gasoline resistant material such as polysulfide. A suitable spring, such as the spring 114, is connected to urge the floats to a horizontal position. The end of each float 110 adjacent the annular flange 100 is provided with a laterally extending lug 116 on the inner end of each element 112 positioned to be engaged by the annular ring 98, so that upon relative movement of the flange 100 and the ring 98 toward each other, as when the tube 14 is retracted from the tank, the floats are pivoted downwardly against the force of the springs 114 to the folded position shown in FIG. 3.

A cylindrical ring magnet 118 is concentrically disposed within the tubular member 14 and is slidable longitudinally therein. The ring 118 is carried by a pair of circular plates 120, 122 which are held together as by means of the bolt 124. Bolt 124 extends upwardly to a suitable connector 126 to which the lower end of the tape 84 is connected. The plates 120 and 122 are also provided with suitable apertures for passage there through of the wires 86 and 88. The weight of this structure and of the counterweight 81 are adjusted in proportion to the diameters of the reel 80 and the shaft 82 so as to substantially balance each other, whereby the cooperating fields of the magnets 106 and 118 will cause the magnet 106 to accurately follow the floats.

Wires 86 and 88 pass through a connector plate 128, provided with suitable insulators 130, 132, and down through a central bore of a switch carrier member 134 which extends downwardly into the tube 92. The carrier member 134 is held in position by the friction of the O-rings 136. This carrier member has in its central bore a reed switch 138 of the type which is caused to close by a megnetic field.

The float 96 is longitudinally slidably received on the tube 92 below the location of the switch 138, its upper travel being limited by a collar 140 attached to the tube 92 near the lower end of the switch 138. At the lower end of the tube 92 the float is retained by an annular flange member 94 provided with a threaded portion 142 which is screwed into a tube closure plug 144 welded into the end of the tube. A bottom compression pad 146 screws, or is bonded, into the bottom of the flange 94 and extends slightly below it to provide a support member against the bottom of the tank 12. This pad is preferably of a compressible, relatively soft material to provide a cushion for the lower end of the instrument and to absorb differential expansions.

The float is made of a low density material which may be the same as that of the float 26, and carries within it an annular ring magnet 148 which surrounds the tube 92. A guide ring 150 is also carried within the float and extends radially inwardly to a smaller diameter than the magnet to guide the float as it moves up and down the tube 92. The guide ring 150 may be made of a low friction material such as nylon, for example.

In order to insure stability of the float and proper density so that it will float at the interface of the water and the gasoline, a ballast weight ring 152 is molded into the lower end of the float. The float is also provided with upwardly facing cavities 154 into which lead shot, in a suitable binder, may be poured to adjust the density of the float. It will be appreciated that the float must have a density intermediate that of gasoline and water, i.e., preferably about the average of these densities.

In a typical installation the normally open switch 138 is located so that it will become closed by the magnetic field of the magnet 148 when the water level in the bottom of the tank reaches a certain predetermined depth, typically 1 inch. The trip point is adjusted with the float 96 resting on the flange 94 by moving the switch holder assembly 134 vertically in the tube 92 against the frictional resistance of the O-ring 136. The switch holder is moved downwardly until switch 138 is observed electrically to turn on. From this position the switch assembly is retracted a distance equal to the float upward travel corresponding with the desired maximum water level. Thus, when the assembly is installed in the tank, float 96 will rest on the flange 94 until the water level rises enough to cause the float to rise upwardly. When the water level rises further to the desired maximum level, the magnet 148 comes close enough to the switch 138 to cause it to close, and a signal is thereby generated which is carried off through the electrical conduits 86, 88 to appropriate monitoring equipment as hereinafter described, thereby providing an indication that the water level in the tank is too high and that water must be removed. When the water is pumped out, the float will follow the water level downwardly, first moving to the point that the magnetic field of magnet 148 will no longer hold switch 138 in closed position, and finally coming to rest on flange 94 if sufficient water is removed.

Binary Code Generation

Figure 6:
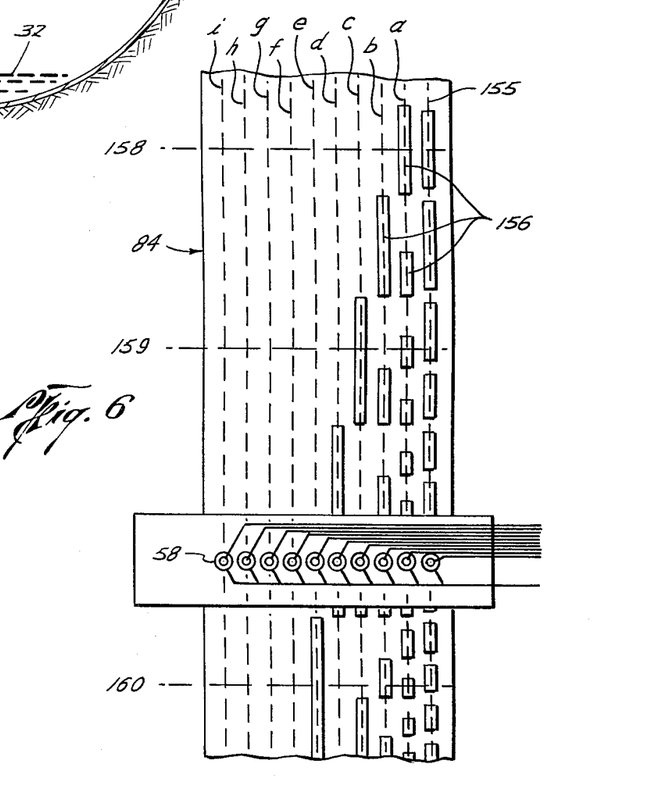
FIG. 6 is a fragmentary view showing one embodiment of binary coded tape in accordance with this invention, together with photoelectric reading devices for the tape.

FIG. 6 illustrates a preferred embodiment of binary coded tape for use in the apparatus of this invention. The tape 84, in the embodiment shown, comprises photographic film, encoded with a strobe channel 155, as hereinafter described, and a binary format of "windows" having sufficient channels to produce the required degree of accuracy of readings, the windows being transparent areas on the film. In the embodiment shown in the drawing, nine such channels $a$ to $i$ are provided, thereby giving 512 discrete tank level indications, although any other number may be selected as required for accuracy. The spacing of the various coded increments is made the same as the liquid depth increments of the tank. In the case of a tank with constant horizontal cross-section, for example, a cylindrical tank standing on end, the coded windows are vertically sized in equal increments throughout the length of the tank, and the vertical length for each code is made equal to the tank height divided by the number of increments used. In the case of a variable horizontal cross-section, for example, a cylindrical tank lying on its side, variable lengths may be used for the coded increments so as to represent equal volumes of liquid in each increment. Alternatively, equal spacing of codes may be utilized, and the volume may be computed for each code.

It will be appreciated that each of the photocouplers, if energized, will produce a signal if it is opposite a window, but no signal if it is not opposite a window. Thus, a combination of the signals from the photocouplers will produce a binary numeral corresponding to the level of the liquid in the tank. Thus, if the uppermost code 158 is aligned with the photocouplers, a signal will be produced by the element of channel $a$ but no signal will be produced by the other elements. Thus, the combined signal will be a binary "one" indicating the first liquid level increment above zero. If the code 159 is opposite the photocouplers, a binary 101 will be produced, indicating the fifth liquid level increment, and if code 160 is aligned with the photocouplers a binary 10011 will be produced, indicating the 19th liquid level increment. The tape may be reversed, with a binary "one" indicating a full tank, if the logic is properly designed for such data.

The strobe channel 155 provides a means for determining whether the photocouplers and a particular code on the tape are totally aligned on a coded increment. Because of inherent inaccuracies in the optics, and in placing the photocouplers, and the windows in the tape, the photocouplers will not switch simultaneously at the transition between codes, and erroneous readings will be obtained in these regions. To preclude this, the windows in the strobe channel are dimensioned and positioned to provide dark gaps extending from just before the end of each code to just after the beginning of the next adjacent code. Then, as will hereinafter be explained, no data on fuel level will be stored in memory unless a strobe signal exists at the same time as the level code signal, thereby eliminating the erroneous transition data from record.

Instead of the transparent windows and photocouplers, other reading means well known in the art may be used. For example, a tape may be magnetically encoded and a magnetic read head used. Other possible alternatives include electrical contactors sensing conducting windows or open windows.

Transmitter Assembly

Figure 7:
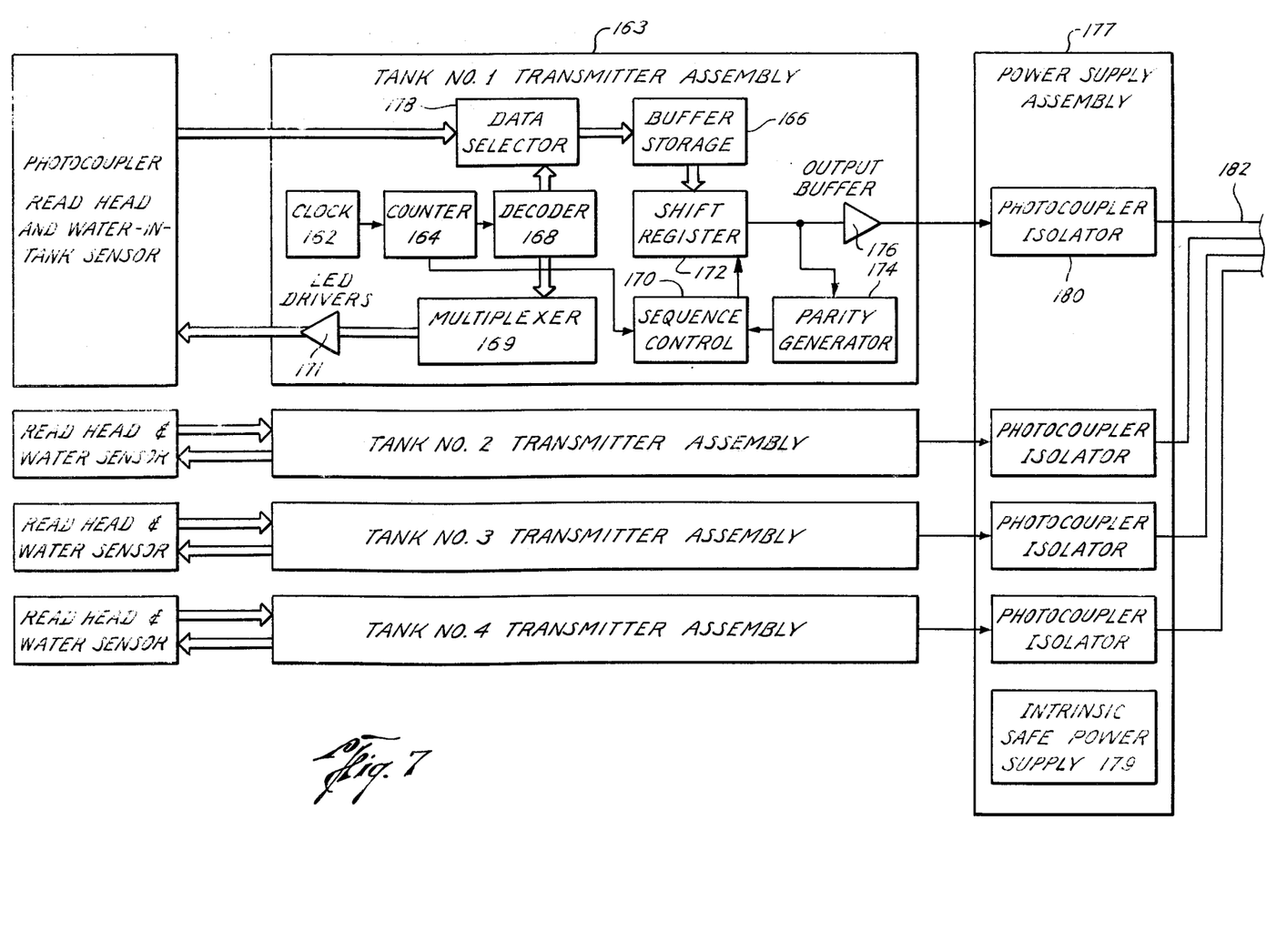
FIG. 7 is a block diagram of one embodiment of data transmitter according to this invention.

According to the present invention, a transmitter assembly is provided on the printed circuit boards 75, 77 to turn the photocouplers on and off and to collect the data from the photocouplers, condition the data and transmit the data to a remote receiving unit. In FIG. 7, four transmitter assemblies are shown, one for each of four tanks to be monitored, although only one is shown in detail. As shown in the block diagram of FIG. 7, a preferred embodiment of a transmitter assembly consists of a clock 162 for generating a timing signal; a counter 164 for counting down the clock output frequency to a signal with a frequency suitable for the various control and sequencing circuits; and decoder 168 and multiplexer 169 which select a single photocoupler pair, and by means of the LED drivers 171, turn on the LED of that pair, and which also operates a data selector 178 to allow the output of the photocoupler pair thus selected to be read into a storage buffer 166, and which then turns off the selected photocoupler pair and then repeats this sequence with the next selected photocoupler pair.

The internal operational status of the transmitter is always in either one of two states: Marking or Transmitting. The relatively slow operation utilizing the sequential operation of the photocouplers and alternate marking and transmitting operation of the transmitter is made possible because tank levels change slowly, so that quick response to change is not necessary. Such multiplexing allows the use of very low power throughout the portion of the system which is within the housing. This is extremely important in a gasoline tank environment, since the system is required to be one in which no spark can be created, i.e., "intrinsic safe."

In the preferred embodiment, the data is read in two words, the first word including a bit from the strobe channel and five data bits from the first five tape channels of the tank level codes, and the second word including a bit from the strobe channel, bits from the last four tape channels of the tank level code, and a "water-in-tank" bit from the conductors 86, 88 from switch 138 indicating the presence or absence of an undesirable level of water. However, where a non-flammable liquid is being measured, or where other suitable precautions against explosion are taken, the data bits may be read simultaneously and processed together.

In the preferred embodiment, in the "marking" state, the decoder 168 enables a multiplexer 169. The output of the multiplexer sequentially enables the LED drivers 171, one of which is provided for each LED. The corresponding gates in a data selector 178 are also enabled by the decoder in a sequential manner, thereby causing a sequential reading of the first six adjacent photocoupler pairs (strobe channel followed by channels $a$, $b$, $c$, $d$ and $e$) and the storing of the outputs of each of the six sampled photocoupler pairs in a storage buffer 166. At the same time the sixth channel, channel $e$, is being sampled and stored, the sequence control 170, driven by the counter, causes the contents of the buffer storage 166 to be transferred in parallel to shift register 172. The design of such sequence control circuitry is well known in the art, and forms no part of this invention, therefore, a detailed description is unnecessary and undesirable. The operational state of the transmitter then changes from "marking" to "transmit."

In the transmit state no photocouplers are energized; rather the sequence control circuitry 170 causes the shift register to read out serially its contents through output buffer 176 to a photocoupler isolator 180, located some distance away from the storage tank. The shift register output signal consists of a stream of eight bits. The first bit is a start bit which is created by grounding the input of one input channel of the shift register, and is later used by the receiving unit to synchronize the receiving and decoding operations. The second bit is the "word" bit, which comes from the decoder via the data selector. In the preferred embodiment, this bit is necessary because the sampling format selected for the design of the present invention provides for sampling only five of the nine tank level photocoupler pairs, transmitting that data and then sampling the other four photocouplers plus the water-in-tank bit and transmitting that data. This format was selected in order to reduce both the number of circuits needed for the design and the electrical power consumed. In operation, the eight output bits of the shift register consist of the start bit, the word bit and six data bits including the strobe bit. The word bit thus indicates which of the two sets of data is being transmitted. It should be kept in mind that for this purpose the output of the strobe photocoupler pair is a data bit and it appears as the third bit of the eight bit word output for each word.

As the shift register 172 reads out its contents, the output is monitored and a parity bit is generated by the parity generator 174. This parity bit is then inserted into the transmitted bit stream as a ninth bit, following the eight bit shift register output. After the sequence control 170 senses the insertion of the parity bit, it stops transferring out the contents of the shift register and at the same time the decoder 168 causes a "stop" bit to be inserted into the bit stream to be used later in decoding and this tenth bit completes the word to be transmitted.

The "transmit" state has been completed for a word and the operational status now returns to the "marking" state and the sampling of the data for the second word is commenced. After the data for second word have been sampled in the same fashion, the internal operational state of transmitter assembly 163 changes once again to the "transmit" mode and the second data word is transmitted. After the second word is transmitted, the transmitter operational status returns to the "marking" state and repeats the entire operational sequence.

A suitable clock which may be used in the transmitter of this invention is that described in Application Note ICAN-6267, in the RCA Solid State Data Book Series SSD-203. In the preferred embodiment of the invention, the output frequency of the clock is 2750 Hz ± 4% and the output of the counter 164 provides the main timing signal of 275 Hz. Thus, the bit stream is read out of the transmitter assembly 163 from the output buffer stage 176 at a rate of 275 bits per second. However, other clocks and different output frequencies may be selected without detracting from the invention.

Table I is a time ordered listing of the operational sequences described above. The sampling and transmitting of the two data words required for a complete readout, and, hence, necessary to make a determination of the liquid level and the water-in-tank, requires forty sequences. Each sequence step shown is of a duration of 1/275 second. Further, during each of the 12 sample and store sequences in which tape channels and the water-in-tank channel are read (sequence interval numbers 1, 3, 5, 7, 9, 11, 21, 23, 25, 27, 29, and 31), the decoder 168 turns on the selected photocoupler pair thus turning on the selected LED and its corresponding phototransistor for the full 1/275 second sequence interval or samples the position of the water-in-tank switch. But the output of each phototransistor is not gated by the data selector 178 and allowed to pass to the buffer storage 166 until a small fraction of 1/275 second later. This is done to assure that an LED is "on hard" before the output of the phototransistor is read and stored.

power supply assembly 177, remote from the tank. The photocoupler isolator 180 is an LED and phototransistor combination and, for example, may be a General Electric No. H11C1. These isolators 180 were selected because of their inherently high electrical isolation characteristics. Since the preferred embodiment has been designed for use in a highly flammable gasoline environment, a critical requirement is that an electrical short or other circuit failure within the transmitter assembly 163 or within the photocoupler read head not cause any additional electrical energy to flow from the receiver 186 to the transmitter 163 or to the photocoupler read head, which additional electrical energy might result in ignition of the gasoline or fumes in the tank.

The power supply assembly 177 also contains an intrinsic safe electrical power supply 179 which meets the Underwriters Laboratories safety requirements for explosive atmospheres. This intrinsic safe power supply 179 provides power to the transmitter assemblies 163 located at the tanks to be measured. The preferred embodiment transmitter assembly 163 is composed of components based on metal oxide silicon technology

TABLE I

TRANSMITTER OPERATIONAL CYCLE
Function Performed During Sequence Interval
(Each Sequence Interval = 1/275 Second)

| Sequence Interval Number | Marking State | Transmitting State |
|---|---|---|
| 1 | Sample & Store Strobe Channel | Transmit "stop" bit |
| 2 | Idle | Idle |
| 3 | Sample & Store Tape Channel a | Idle |
| 4 | Idle | Idle |
| 5 | Sample & Store Tape Channel b | Idle |
| 6 | Idle | Idle |
| 7 | Sample & Store Tape Channel c | Idle |
| 8 | Idle | Idle |
| 9 | Sample & Store Tape Channel d | Idle |
| 10 | Idle | Idle |
| 11 | Sample & Store Tape Channel e; transfer contents of storage buffer to shift register | Idle |
| 12 | Idle | Transmit "start" bit |
| 13 | Idle | Transmit word 1 identification bit |
| 14 | Idle | Transmit Strobe Ch. |
| 15 | Idle | Transmit Tape Ch. a |
| 16 | Idle | Transmit Tape Ch. b |
| 17 | Idle | Transmit Tape Ch. c |
| 18 | Idle | Transmit Tape Ch. d |
| 19 | Idle | Transmit Tape Ch. e |
| 20 | Idle | Transmit Parity Bit |
| 21 | Sample & Store Strobe Channel | Transmit "stop" Bit |
| 22 | Idle | Idle |
| 23 | Sample & Store Tape Channel f | Idle |
| 24 | Idle | Idle |
| 25 | Sample & Store Tape Channel g | Idle |
| 26 | Idle | Idle |
| 27 | Sample & Store Tape Channel h | Idle |
| 28 | Idle | Idle |
| 29 | Sample & Store Tape Channel i | Idle |
| 30 | Idle | Idle |
| 31 | Sample & Store "Water-in-Tank" Channel; Transfer Contents of Storage Buffer to Shift Register | Idle |
| 32 | Idle | Transmit "start" Bit |
| 33 | Idle | Transmit word 2 identification bit |
| 34 | Idle | Transmit Strobe Channel |
| 35 | Idle | Transmit Tape Ch. f |
| 36 | Idle | Transmit Tape Ch. g |
| 37 | Idle | Transmit Tape Ch. h |
| 38 | Idle | Transmit Tape Ch. i |
| 39 | Idle | Transmit "Water-in-Tank" Channel |
| 40 | Idle | Transmit Parity Bit |

The electrical signal from the transmitter is sent to a photocoupler isolator 180 which is located in the and uses a multiplexed scheme in order to reduce to a minimum the amount of energy required for transmitter assembly 163 operation. The precise designs of the various components do not form a part of this invention since such components are well known to those skilled in the art. As example, however, the shift register 172 may comprise RCA's type CD 4021A, the decade counter 164 may utilize two of RCA's type CD 4017A, and the buffer storage 166 may consist of three dual latches such as RCA CD 4013A, all of which are shown in the aforesaid RCA Solid State Data Book. The multiplexer 169 and the date selector 178 may suitably comprise conventional NAND and NOR gates and JK flip-flops.

LEVEL SENSOR COMPUTER ASSEMBLY

Figure 8:
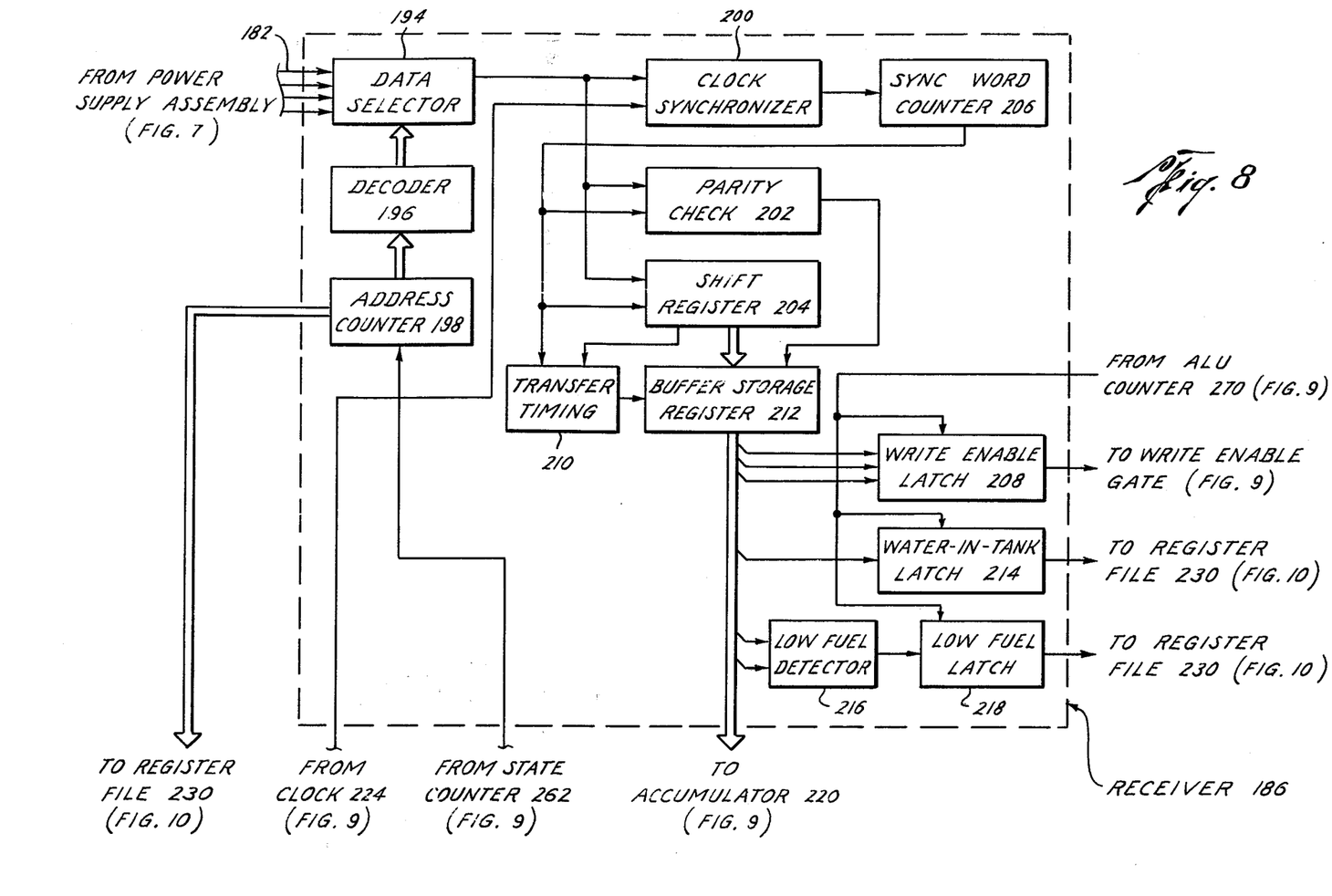
FIG. 8 is a block diagram of one embodiment of a receiver according to this invention.
Figure 9:
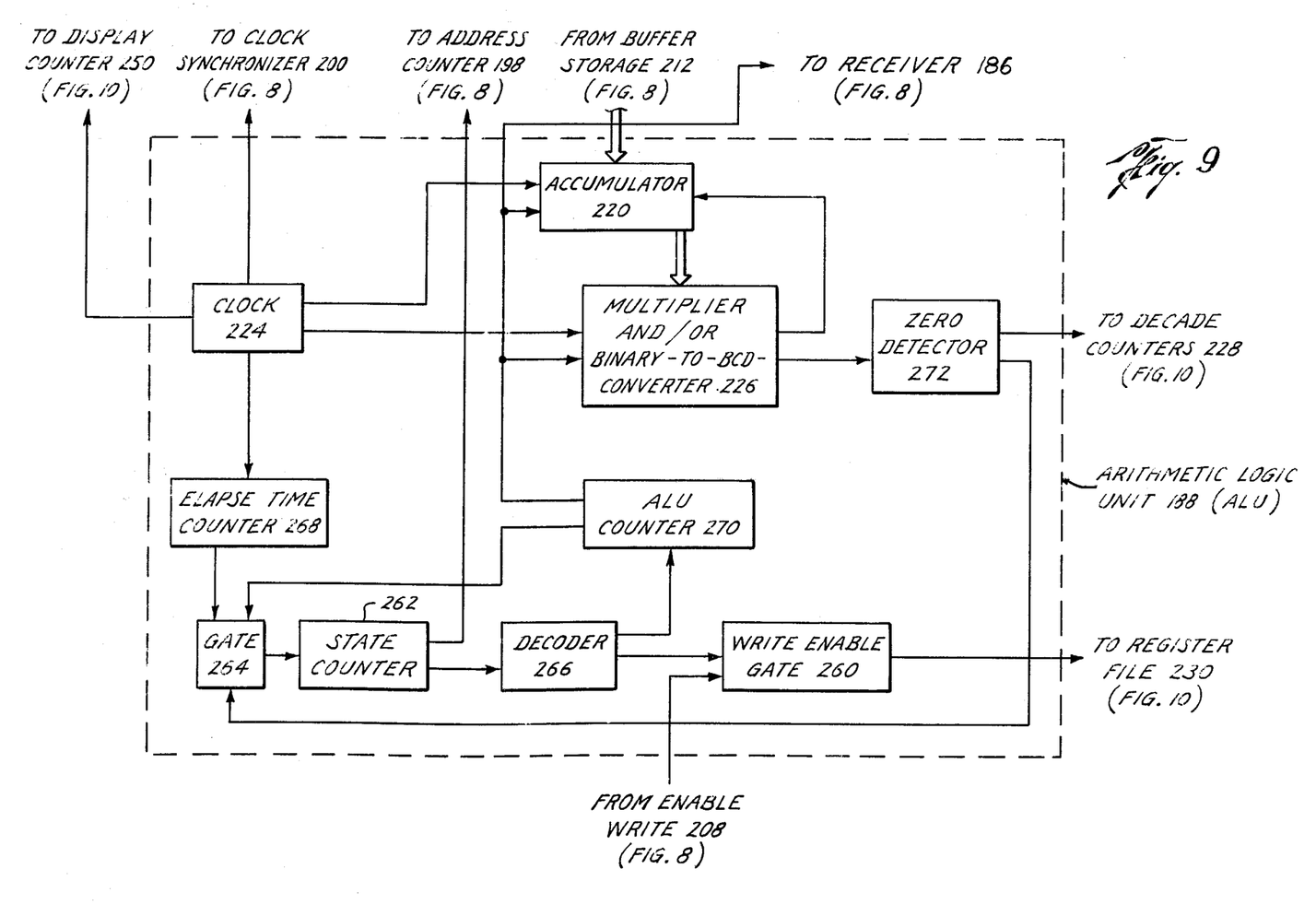
FIG. 9 is a block diagram of one embodiment of an arithmetic logic unit according to this invention.
Figure 10:
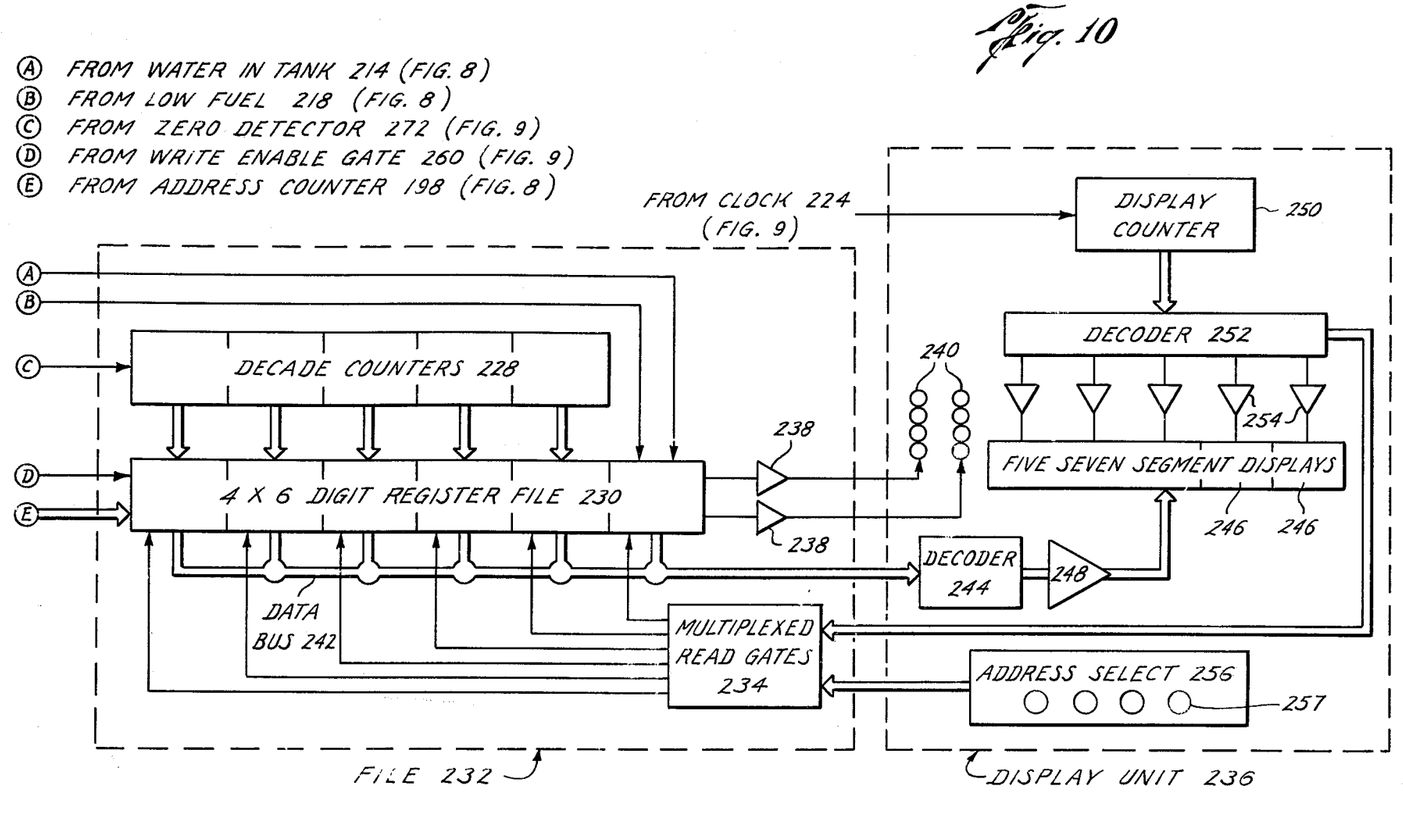
FIG. 10 is a block diagram of one embodiment of file and display units according to this invention.

The output signal of the photocoupler isolator 180 is sent by wire 182 to a level sensor computer assembly. The level sensor computer assembly consists of a receiver 186, an arithmetic logic unit (ALU) 188, a file unit 232 and a display unit 236 as illustrated in FIGS. 8, 9 and 10. This computer is utilized to receive level sensor data from one or more tanks, decode the data, perform any necessary computations, store the data and select display data as desired by the user.

The preferred embodiment of the present invention is structured to receive level data from as many as four tanks but the concept disclosed herein is not limited to only four data inputs but can be expaned to handle additional tank level data inputs as desired.

In the construction of the components of the computer assembly, conventional digital TTL logic using 7400 series integrated circuits are preferably used. The designs of the components will be apparent to those skilled in the art, and need not be detailed here.

Receiver

As shown in FIG. 8, the output signals of the photocoupler isolators 180, which are the same 10 bit words which form an output of each of the transmitter assemblies, are brought into the receiver 186 at the input of the data selector 194. The data selector 194 is a set of NAND gates which multiplex the input signals thereby allowing only the data from one tank at a time to be received for processing by the receiver 186. The data selector 194 is controlled by a decoder 196, which may comprise NAND gates which decode the address output of the address counter 198. The output of the address counter, which may comprise a pair of JK flip-flops, indicates which of the four tanks is to be selected.

It will be appreciated that where more than one tank is being monitored, the transmitter for each tank will operate continuously, repeating the operational cycle of Table I approximately seven times per second. However, the address counter will open only one gate of the data selector at a time, for a period sufficient to insure that both data words each comprised of 10 bits have been received. Since the tank level changes very slowly, it is not necessary to continuously compute level data for each tank.

From the data selector 194, the 10 bit data word is sent to the clock synchronizer 200, to the parity check circuitry 202 and to a shift register 204. The clock synchronizer 200 receives a local clock timing signal from clock 224 (which may be, but need not be, identical to the clock 162 of the transmitter) located in ALU 188 of FIG. 9, detects the "start" bit of the incoming data word from the data selector 194, and generates a synchronization signal which is supplied to the sync word counter 206. The sync word counter 206 provides a clock signal in synchronization with the incoming data word to be read by the parity check circuitry 202 and the shift register 204. The parity check circuitry 202 looks to see that proper bit parity has been maintained during the transmission which gives assurance that the word has been transmitted error free. If proper bit parity has not been maintained the word contains an error and the parity check circuitry 202 does not set the write enable latch 208 when the data word is transferred to accumulator 220. Therefore, the faulty data word cannot be entered into the register file 230 of file 232 nor can it be displayed by the display unit 236. The effect of detecting improper bit parity is that the computer simply ignores the faulty data word.

The write enable latch is also not set if the strobe channel bit, read out of the shift register 204, indicates that the tape was positioned in the photocoupler read head such that the reading made was made in or near a region of code transition on the tape. The write enable latch 208 is also not set if a noise pulse is detected within the first half of the "start" bit by the clock synchronizer 200. Thus any of three different conditions may cause the computer to ignore a data word.

During the time when a data word is being received the shift register 204 is serially loaded with the "start" bit, the word designator bit and the six data channel bits. Whe the "stop" bit is detected, transfer timing 210 automatically generates a transfer command which transfers the appropriate bits into the buffer storage register 212, in parallel. The five data channels, if the data word is word 1, or the four data channels if word 2 is being processed, are transferred in parallel into the appropriate one of nine storage latches of buffer storage register 212. The word bit, bit 2, determines in which part of the register 212 the data is transferred. The strobe bit, the water-in-tank bit and the status check bits are also store in buffer register 212.

The low fuel detector 216 comprises a NAND gate which monitors the bits of word 2 which correspond to tape channels $h$ and $l$ and, hence, are the two most significant bits of the full nine bit word giving the fuel level in the tank. These status check bits indicate the absence of windows in the tape channels $h$ and $i$, thereby indicating that the fuel level is low.

The contents of the buffer storage register 212 at the completion of processing by the receiver 186 are the nine data bits which correspond to the code read from the coded tape in the tank level sensor photocoupler read head, the strobe bit, the water-in-tank bit and the status check bits. When the arithmetic logic unit (ALU) 188 discussed below is ready to process data received from the next tank in sequence, the ALU counter 270 (FIG. 9) gives a transfer command to transfer the data from the nine-channels to the accumulator 220 in the ALU, and to transfer the strobe bit to the write enable latch 208, the water-in-tank bit to the water-in-tank latch 214 and the status check bits to the low fuel latch 218.

Arithmetic Logic Unit (ALU)

The Arithmetic Logic Unit (ALU) 188 multiplies the received nine bit binary data word by an appropriate predetermined factor which depends on the particular geometry of the tank in which the level is being measured. The ALU contains an accumulator 220 for receiving and storing the data word from the buffer storage register 212.

Sequence control is provided for sequencing the ALU through each of four steps: (1) wait, (2) multiply, (3) convert to binary-coded-decimal, and (4) write. The clock 224 of the sequence control provides a local clock timing signal for the ALU and also for the clock synchronizer 200. Another timing signal from the clock is provided to the display counter 250 (see FIG. 10).

The sequence control may be constructed in any suitable manner known in the art to accomplish the multiplying, conversion to binary-coded-decimal, and write enabling functions. In the preferred embodiment, a multiplier-and/or-binary to BCD converter as shown in FIG. 9 is used. In applicatons in which it is desired to merely disply liquid level in inches, the multiplying function may be omitted altogether, or a multiplier of one may be used. Whenever the encoded increments on the tape do not have a one-to-one correspondence to the output display increments of inches or gallons, a multiplication factor must be applied to the data word before it is converted to a binary coded decimal and displayed. When a multiplier is used in conjunction with the BCD converter, the multiplier takes the binary data word from the accumulator 220, multiplies the binary number by the appropriate factor and stores the product in the accumulator 220. The multiplier by be modified as necessary to provide the necessary conversion to a number indicating the volume of fuel in the tank. The binary numer is then converted to binary-coded-decimal, and upon completion of this conversion a "write" signal is transmitted to the write enable gate 260.

A suitable arrangement for effecting these operations is depicted in FIG. 9. A "state" counter 262 having four different states is enabled by the output from a gating circuit 264. As the counter 262 advances, the state is decoded at 266. The first state in the series is "wait", to insure that sufficient time has elapsed, as indicated by a time elapse counter 268, for the buffer storage 212 (see FIG. 8) to receive the next word. On a signal from the time elapse counter, the gate 264 advances the state counter to the next state. The decoder 266 thereupon signals the ALU counter 270, which in turn signals the accumulator 220 and the multiplier-and/or-binary to BCD convertor 226 to load the accumulator 220 with the contents of the buffer storage register 212 and then begin the multiplication step. Upon completion of the multiplication step, the ALU counter provides a signal to gate 264 to advance the state counter to the next state, the binary-to-BCD conversion step. The conversion step consists of subtracting "one" from the multiplication product stored in the accumulator, sensing to determine if the remainder after subtraction is zero, sending a pulse to the counters 228 (see FIG. 10) for each subtraction performed, and counting the number of substractions required to reduce the product stored in the accumulator to zero.

The pulses are sent through a zero detector 272 to the decade counters 228 and counted. When the two zero detector ascertains that the store product has been subtracted down to zero, it provides a signal to the gate 264 to advance the state counter to the write step. This causes the decoder to provide a signal to open the write enable gate 260, thereby allowing the write enable signal to be transmitted to the register file 230 provided the write enable latch 208 permits, so that the file can receive the data from the decade counters. Upon completion of the write step, the ALU counter provides a signal to gate 264 to advance the state counter to the wait state. At the conclusion of a sufficient time elapse, the time elapse counter provides another signal to the gate 264 to return the state counter to the "multiply" step.

The state counter also provides a signal to the address counter 198, at the same time as the multiplying state signal, to advance the address counter to address the next tank in sequence. Thus, data from the next tank is being received through the data selector 194 and stored in the buffer storage register 212 while the foregoing computations are taking place on the data from the previous tank.

File

As shown in FIG. 10, the file 232 section receives the BCD data word from the ALU 188 and stores it for display by the display unit 236. When the write enable gate 260 permits, the BCD data is entered into the register file 230 from the counter 228 and the water-in-tank and low fuel status signals are also entered into the register file 230. The water-in-tank and low fuel status signals are continuously sent to display indicator lights 240 by means of the status lamp drivers 238, causing a corresponding light 240 to be energized if there is excess water-in-tank or a low fuel level.

Upon command from the multiplexed read gates 234, a set of four bit BCD data, each of which comprises a single decimal digit, is gated onto a data bus 242 and transferred to the decoder 244 within the display unit 236. The data bus 242, operated in conjunction with the multiplexed read gate 234, results in a saving of electrical power operating requirements since only one set of four bit BCD data from a single register in the register file 230 appears on the data bus 242 at any one time for transmission to the display unit 236.

The number of decade counters 228 and the amount of register file 230 required is dependent upon the resolution of the encoded tape, i.e., the number of channels and the desired resolution of the displayed volume. For example, if a display resolution of 20 gallons is desired and a nine channel tape is used, then five decade counters 228 will be sufficient for a tank of a volume less than or equal to $(2)^9 \times (2)^5 = (512) \times (32) = 16,384$ gallons. For the same tape and resolution requirement, four counters 228 could handle up to $(2)^9 \times (2)^4 = (512) \times (16) = 8,192$ gallons. For the preferred embodiment of the present invention, a readout resolution of 20 gallons was desired for a 10,000 gallon tank: hence, five decade counters 228 are utilized.

Similarly, if the level sensor output is to be displayed as depth in inches and if the desired output resolution is 0.25 inch, three decade counters 228 and a two bit counter 228 would provide the 0.25 inch resolution for a tank of maximum depth of 127.75 inches if a nine channel binary encoded tape is used.

Display Unit

The display unit 236 shown in FIG. 10 provides a visual numerical (decimal) readout of the selected tank level sensor, and may consist of any suitable display system of many that are known in the art. In the embodiment shown in the drawing, the readout consists of a five decimal digit display 246, five decimals being necessary as explained above. The multiplexed BCD data is taken from the data bus 242 by the decoder 244 whose output is a set of seven signals each of which passes through a segment driver 248 and lights a single segment of a seven segmented digital display 246. Each digital display consists of seven segments which when illuminated in the proper combinations by the output of the line segment drivers 248 can illuminate as a decimal digit 0 through 9.

The address select 256 provides four pushbuttons 257 by which an operator may select one of the four tanks. The display counter 250, using the clock signal for timing, controls a decoder 252, which selects a particular digit to be outputted onto the data bus 242 by commanding the multiplexed read gates 234 and at the same time by means of the display enabling drivers 254 enabling the appropriate one of the five digital displays 246 to be illuminated. Although the data to the display unit 236 is multiplexed and, hence, only one of the five displays 246 is illuminated at any instant, the multiplexing rate is fast enough so that to the human eye it appears as if all five digits are illuminated simultaneously.

The apparatus of this invention therefore provides a continuous monitoring of the level of fuel in one or more fuel storage tanks, together with a continuous indication of low fuel level and excessive water. The attendant may selectively interrogate the file to obtain a display of the fuel level in any tank, and the appropriate indicator lights 240 automatically turn on when fuel level is low in a tank or excess water is in a tank. The operator thereby receives a warning signal so that he can take appropriate action.

Although a preferred embodiment of this invention has been shown and described, the invention is not limited to the preferred embodiment, since substitutions of elements, components and assemblies, and modifications within the scope of the invention will be apparent to those skilled in the art upon reading the foregoing description. The invention is therefore to be construed to include all such substitutions and modifications which are within the scope of the appended claims.

We claim:

1. A storage tank liquid level sensor comprising
an elongated tubular member adapted to be inserted into a storage tank,
first means on said tubular member for sensing the level of a first liquid in said tank,
second means on said tubular member for sensing the level of a second liquid in said tank having an interface with the first liquid comprising, respectively,
first and second floats having different densities, whereby one of said floats will float on one liquid and the other will float at the interface between the liquids, each float including
an annular affixed thereto and slidably engaging the exterior of said tubular member,
means inside each tubular member operable in response to the magnetic field of each of said annular magnets to constantly create separate signals indicative of the level of each liquid, and
means functioning in response to said sensing means for providing a substantially continuous indication of the level of each of said liquids.

2. A storage tank liquid level sensor as defined by claim 1 wherein
one of said signal creating means comprises a switch which is closed by the magnetic field of one of said magnets.

3. A storage tank sensor comprising
a non-magnetic tubular member having a length sufficient to reach from substantially the top to substantially the bottom of a storage tank,
first and second annular magnets slidably engaging the exterior of said tubular member,
a float connected to each annular magnet whereby each magnet will be moved vertically with vertical movement of its connected float,
the first float being located above the second float and having a density less than that of the second float, whereby the first float will float on the surface of a liquid having a density intermediate the densities of the floats, and the second float will float at the interface between said liquid and another liquid having a density greater than the density of the second float,
first means actuable in response to vertical movement of said first float to substantially continuously create a signal indicative of the level of the lower density liquid, and
second means actuable in response to vertical movement of said second float to substantially continuously create a separate signal indicative of the level of the higher density liquid.

4. A storage tank sensor comprising
a non-magnetic tubular member having a length sufficient to reach from substantially the top to substantially the bottom of a storage tank,
first and second annular magnets slidably engaging the exterior of said tubular member,
a float connected to each annular magnet whereby each magnet will be moved vertically with vertical movement of its connected float,
the first float being located above the second float and having a density less than that of the second float, whereby the first float will float on the surface of a liquid having a density intermediate the densities of the floats, and the second float will float at the interface between said liquid and another liquid having a density greater than the density of the second float,
a magnetic element slidably received in said tubular member within said first annular magnet,
a magnetically operable switch having a fixed position in a lower portion of said tubular member than said magnetic element,
an electrical conductor connected to said switch and extending upwardly to the upper end of said tubular element,
means connected to said electrical conductor operable upon actuation of said switch by said second magnet to indicate whether said switch is open or closed,
a tape having transparent windows therein affixed to said magnetic element and extending upwardly through said tubular member to above its upper end,
a reel connected to the upper end of said tape,
means operably engaging said tape for exerting an upward force on said tape sufficient to keep said tape taut when said magnetic element moves upwardly in said tubular member,
the transparent windows in said tape being positioned to form a code indicative of the level of said magnetic element in said tubular member,
photoelectric sensing means adapted to create a signal responsive to a level indicating code, and
means for recording said signal.

5. A storage tank sensor as defined by claim 4, and including intrinsic safe power supply means connected for energizing said sensing means, electrically isolating coupling means connected to receive and transmit signals from said sensing means, means for storing transmitted signals, and display means for displaying numerals corresponding to said signals.

6. A storage tank sensor as defined by claim 5 wherein the transparent windows in said tape are arranged in binary codes in a plurality of channels, each code being indicative of a liquid level, and said photoelectric sensing means comprises a plurality of photocouplers, each aligned with one of said channels, and including means for sequentially energizing said photocouplers to produce a series of binary signals.

7. A storage tank liquid level sensor comprising an elongate tape having a plurality of electrically readable binary codes each indicative of a liquid level, each of said codes comprising a plurality of channels, and a strobe channel, a read head having a plurality of sensors positioned to read said codes, means mounting said tape for movement of said codes past said read head in response to changes in the liquid level in said tank, means for sequentially energizing said sensors to produce a series of binary signals comprising a strobe signal and a binary number representing a liquid level, intrinsic safe power supply means connected for energizing the foregoing means, electrically isolating coupling means connected to receive and transmit said series of binary signals, means for receiving said transmitted signals, means for converting said strobe signal to an enable write signal, means for converting the liquid level code signals to binary coded decimal format, register file means for receiving and storing the binary coded decimal signals when coincident with an enable write signal, means for sequentially strobing the binary coded digits in the register file, and means for displaying the digits represented by the strobed binary codes.

8. A storage tank liquid level sensor as defined by claim 7 and including means for producing a status signal in response to a liquid reaching a predetermined level, said coupling and receiving means being adapted to transmit said signal, and means for displaying an indication of the presence and the absence of such status signal.

9. A storage tank liquid level sensor as defined by claim 7 and including a plurality of sets of said tape, said read head, and said means mounting said tape for movement, each adapted to be installed in a different tank, means for sequentially energizing said sets, whereby a series of binary signals is produced by each read head in succession, means for separately processing the data from each read head and delivering it to the register file means for storage in an individual file, and means for selectively addressing each file to display digits corresponding to the addressed file.

10. In combination for detecting the levels of first and second fluids disposed in a storage tank with the first fluid being disposed above the second fluid and being essentially immiscible with the first fluid, an extensible member having indications individually representing the different positions on the extensible member, a first float member constructed to float on the first fluid and variably positioned in accordance with the level of the first fluid, a second float member constructed to float on the second fluid and variably positioned in accordance with the level of the second fluid, first transducing means attached to the first float member for movement with the first float member, second transducing means physically detached from the first float member and the first transducing means but operatively coupled to the first transducing means for positioning in accordance with the variable positioning of the first transducing means, means coupling the second transducing means and the extensible member for providing a movement of the extensible member in accordance with the variable positioning of the second transducing means, means providing a first output indication, determined by the extension of said extensible member, showing the level of the first fluid, third transducing means attached to the second float member for movement with the second float member, and fourth transducing means physically detached from the third transducing means and operable in response to movement of the third transducing means in the field of the fourth transducing means to provide a separate output indication showing the level of the second fluid.

11. The combination set forth in claim 10, including, fifth transducing means detached from but operatively coupled to the extensible member for producing signals representing the position of the extensible member.

12. The combination set forth in claim 11, including, the extensible member constituting a photographic film having markings in a plurality of channels on the film in a particular code and the fifth transducing means constituting light-sensing means responsive to the different markings on the film to produce electrical signals representative of such markings.

13. The combination set forth in claim 10, including, the first transducing means constituting a magnet and the second transducing means constituting a magnetic member responsive to the field created by the first transducing means to move with the first transducing means.

14. The combination set forth in claim 10, including, the third transducing means constituting a magnet and the fourth transducing means constituting a switch responsive to the movement of the third transducing means to a position near the switch to become operated.

15. In combination for detecting the levels of first and second fluids disposed in a storage tank with the first fluid being disposed above the second fluid and being essentially immiscible with the first fluid, a hollow housing, an extensible member disposed within the housing and extending through the housing for movement relative to the housing and having individual indications representing the different positions on the extensible member, a tubular member disposed within the housing and enveloping the extensible member for movement relative to the housing, first transducing means disposed within the housing and enveloping the tubular member for movement relative to the housing, first float means physically coupled to the first transducing means and disposed within the housing and enveloping the tubular member for resting on the first fluid and for providing a variable disposition in accordance with the level of the first fluid, second transducing means disposed within the tubular member and responsive to the first transducing means for variable disposition in accordance with the variable disposition of the first transducing means, means coupling the extensible member to the second transducing means for movement with the second transducing means, second float means disposed to rest on the second fluid and to provide a variable disposition in accordance with the level of the second fluid, third transducing means movable with the second float means to provide a variable disposition in accordance with the level of the second fluid, and fourth transducing means movable with the extensible member and responsive to the third transducing means, upon a juxtaposition between the third and fourth transducing means, to provide an output indication.

16. The combination set forth in claim 15 wherein means are detached from the extensible member and are operatively coupled to the extensible member to provide signals representing the position of the extensible member in accordance with the indications on the extensible member at that position.

17. The combination set forth in claim 15 wherein the extensible member is provided with markings in a plurality of columns, the markings in the columns at each position representing that position on a coded basis and wherein photosensitive means are positioned relative to the extensible member to sense the individual markings in the different columns in accordance with the position of the extensible member and to produce signals in accordance with such sensings.

18. The combination set forth in claim 17 wherein the first transducing means constitute a magnet and the second transducing means is constructed to be responsive to the magnetic field provided by the first transducing means to follow the movement of the first transducing means.

19. The combination set forth in claim 15, wherein the fourth transducing means constitute a switch operable in accordance with the position of the third transducing means relative to the fourth transducing means to provide an output indication of a particular level for the second fluid in the storage tank.

20. The combination set forth in claim 19 wherein the third transducing means constitutes a magnet and the fourth transducing means is constructed to be responsive to the magnetic field provided by the third transducing means when the third transducing means is in contiguous relationship to the fourth transducing means.

21. A storage tank sensor comprising a non-magnetic tubular member having a length sufficient to reach from substantially the top to substantially the bottom of a storage tank, first and second annular magnets slidably engaging the exterior of said tubular member, a float connected to each annular magnet whereby each magnet will be moved vertically with vertical movement of its connected float, the first float being located above the second float and having a density less than that of the second float, whereby the first float will float on the surface of a liquid having a density intermediate the densities of the floats, and the second float will float at the interface between said liquid and another liquid having a density greater than the density of the second float, first means actuable in response to vertical movement of said first float to create a first signal indicative of the level of the lower density liquid comprising a magnetic element slidably received in said tubular member and cooperably movable with said first annular magnet, a tape having transparent windows therein fixed to said magnetic element and extending upwardly through said tubular member to a position adjacent one end thereof, means operably engaging said tape for exerting a tensile force on said tape and said magnetic element, tending to pull them toward said one end of said tubular member, photoelectric sensing means positioned adjacent said tape for creating a signal responsive to the positions of said transparent windows, and means for recording said signal, second means actuable in response to vertical movement of said second float to create a separate signal indicative of the level of the higher density liquid comprising a magnetically operable switch in a fixed position near the other end of said tubular member and within the latter for actuation by said second annular magnet in said second float, an electrical conductor connected to said switch and extending toward said one end of said tubular member, and means connected to said electrical conductor for indicating whether said switch is open or closed.

* * * * *